United States Patent Office 3,455,629
Patented July 15, 1969

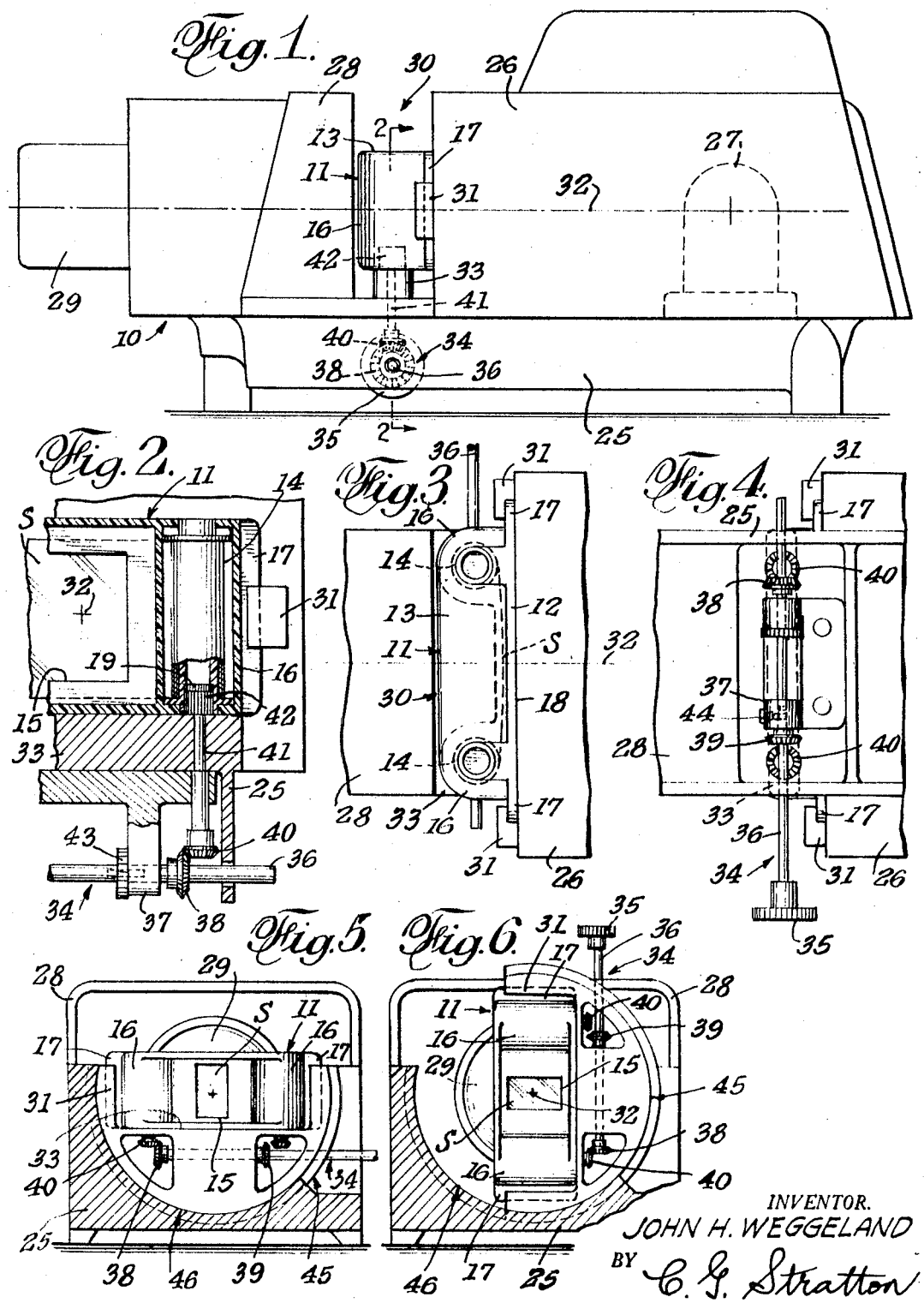

3,455,629
FILM CARTRIDGE PROJECTOR
John H. Weggeland, 9137 Lilienthal Ave.,
Los Angeles, Calif. 90045
Original application May 3, 1965, Ser. No. 452,942, now Patent No. 3,398,912, dated Aug. 27, 1968. Divided and this application Jan. 25, 1967, Ser. No. 622,007
Int. Cl. G03b 23/06
U.S. Cl. 352—72          5 Claims

ABSTRACT OF THE DISCLOSURE

A projector has a front housing containing an optical system and a rear housing containing a light source aligned with the optical system. The two housings are separated from each other by an opening sufficient to mount a film cartridge between the two housings. A pair of vertical trunnions is mounted at the opening, one on each side of the axis of the optical system, for driving the spools of the cartridge. A longitudinally shiftable drive shaft is mounted below the opening for rotation in one direction only. The shaft is provided with gears such that upon shifting of the shaft the trunnions are selectively driven.

Cross-reference to related application

This application is a division of applicant's pending application Ser. No. 452,942, filed May 3, 1965, now Patent No. 3,398,912 titled "Film Cartridge and Projector Therefor."

Summary of the invention

This invention comprises a projector provided with means to advance a strip of film that is housed in a cartridge so the same does not require to be handled in order to be advanced, but with the cartridge in position in the projector, may be advanced or shifted in either direction relative to the beam of a projection lamp in the projector by such film-advancing means.

The cartridge is handled as a unit that may be inserted into and removed from the projector at any time and irrespective of the advanced position of the film strip.

Since the frames of pictures on said strip may have the subjects of the pictures either horizontally or vertically disposed, so that some of the pictures read horizontally and others vertically, the projector, in addition to the above, may be provided with means to rotationally turn the cartridge between two positions, phased ninety degrees.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, preferred embodiments of the present invention, which are given by way of illustration or example only.

Brief description of the drawing

In the drawing, like reference characters designate similar parts in the several views.

FIG. 1 is a side elevational view showing a projector according to one form of the invention, with a film strip cartridge in operative position therein.

FIG. 2 is an enlarged fragmentary vertical sectional view as taken on the line 2—2 of FIG. 1.

FIG. 3, to the scale of FIG. 1, is a fragmentary plan view of the cartridge-mounting portion of the projector.

FIG. 4 is a fragmentary bottom plan view of the portion of the projector shown in FIG. 3.

FIG. 5 is a cross-sectional view showing a projector, according to another form of the invention, embodying cartridge-mounting means that is rotationally adjustable, said view showing said means adjusted to one viewing position of the cartridge.

FIG. 6 is a similar view showing the latter projector adjusted 90° to the other viewing position of the cartridge.

Description of the preferred embodiments

The present projector 10 (FIGS. 1 to 4) and the projector 10a (FIGS. 5 and 6) are adapted to interchangeably receive and hold in picture-viewing position, a cartridge 11 that is preferably molded of two cemented parts 12 and 13 to form a rectangular housing for two similar spools 14 on which the ends of a film strip S are wound to span between said spools across the housing. An aperture 15 is centrally provided in the cartridge between the ends 16 that are formed to house the spools 14. The cartridge part 12 is provided with extensions 17 that extend beyond said spool-housing end 16.

Irrespective of the manner of construction of the cartridge 11, the same comprises an elongated body with opposite flat upper and lower faces, the mentioned extensions 17 disposed in alignment with the rear face 18, and the spools being rotationally held in the cartridge ends 16 in parallelism. In this case, each spool has at least one end that extends through the lower face of the cartridge body, a serrated or similar bore 19 being provided in said extending spool end.

It will be understood that either spool 14, when turned on its axis, may wind up one end of the strip, the other spool turning freely and allowing the other end of the strip to unwind therefrom. A light friction drag (not shown) may be provided so the film, as it is wound on one spool and unwound from the other, is retained taut.

The projector shown in FIGS. 1 to 4, in any conventional manner, is provided with a base 25 that mounts a housing 26 having a light source 27, and with a housing 28 in which an optical system 29 is contained. Between the housings 26 and 28 is provided a space 30. According to the invention, a cartridge-holding means comprising slideways 31 is provided to engage the extensions 17 of a cartridge 11 inserted into space 30 from above. In this case said slideways are carried by the housing 28 and are located so that the portion of the film strip S that is centered in the aperture 15 is on the axis 32 of the beam of light that is directed from the light source 27 to and through the optical system 29. A block 33 on the projector base 25 serves as a support for the cartridge, thereby locating the same vertically with respect to said light beam 32.

The above-described projector is provided with drive means 34 to selectively rotate either spool 14 of a cartridge 11 in a direction to feed the film strip S past the aperture 15.

Said drive means 34 is shown as a knob 35 (which may be a motor) on a shaft 36 that is rotationally and slidingly mounted in a bearing 37 affixed to the base 25. Two bevel gears 38 and 39 are affixed to said shaft in such spaced relation that only one or the other may be positioned to mesh with driven pinions 40, according to the shifted position of the shaft 36. Each said pinion 40, by a shaft 41, is connected to a trunnion 42 that has a serrated cylindrical face, and is upwardly directed above the support face of the block 33. The shafts 41 are spaced according to the spacing of the spools 14 of a cartridge placed in the projector. Accordingly, said trunnions are adapted to project into the serrated bores 19 of the cartridge spools and effect a driving connection between the shafts 41 and said spools.

The driving arrangement is such that the shaft 36 can turn only in one direction, a ratchet device 43 being provided to prevent reverse rotation. Thus, in one shifted position of the shaft 36, the gear 38 is in mesh with one pinion 40, providing a film strip takeup rotation of the spool 14 at one end of the cartridge 11. In the other shifted position of the shaft 36, the gear 39 is in mesh with the other pinion 40, providing a film strip takeup rotation of the spool 14 at the opposite end of the cartridge.

Detent means 44 may be provided to engage grooves in the shaft 36 that are longitudinally spaced to selectively engage said detent means in either shifted position of said shaft. Thus, the frames or pictures on said film strip S may be brought into projection register with aperture 16 in any sequence or succession desired.

As shown in FIGS. 5 and 6, the cartridge-holding means 17, as well as the cartridge 11 placed therein and the drive means 34, may be carried by rotational means 45 which is movable in guide means 46 around the axis 32 of the light beam that passes through aperture 15 of said cartridge. This arrangement provides for viewing the subjects of the exposed frames of the film strip that are phased 90° with respect to the subjects on the other frames. In other respects, this modification may embody the above-described features of the earlier form of the invention.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A projector comprising:
    (a) a section that houses a light source and a section that mounts an optical system aligned with a beam of light from said source to project said beam, a space being defined between said sections and open from above,
    (b) means to guide and removably hold a film cartridge insertable from above into said space, the film in the cartridge being wound on two parallel spools that, with the cartridge in said space, are disposed one on each side of the axis of the light beam, and the portion of the film spanning between the spools being subject to projection by said light beam,
    (c) a manually rotational and longitudinally shiftable shaft mounted in the projector below the cartridge in the projector opening and provided with means whereby the shaft is rotationally movable in one direction only,
    (d) a pair of vertical trunnions carried by the projector aligned with the respective spools and formed to effect driving engagement therewith when the cartridge is inserted into said guide and holding means, and
    (e) selective gearing connecting said shaft and the trunnions to drive the latter and the spools connected thereto in film takeup directions.

2. A projector according to claim 1, said gear means including means to mount said shaft to shift between two positions, one connected to one trunnion and the other to the other trunnion.

3. A projector according to claim 1, said selective gearing comprising:
    (a) a pair of bevel gears connecting the shaft with each trunnion,
    (b) the driving gears of each pair being spaced apart so that only one or the other thereof is adapted to mesh with its paired gear, and
    (c) means mounting the shaft adapting the same to be shifted selectively to engage said pairs of gears.

4. A projector according to claim 1,
    (a) a rotational part on said projector which carries the cartridge-holding means, the shaft, pair of trunnions and the selective gear means, and is mounted between said sections, and
    (b) means on the projector to guide said rotational part for movement from one position to a position phased 90° therefrom.

5. A projector according to claim 4, said guide for the rotational part comprising interengaged arcuate portions generated on the axis of the beam of light.

References Cited

UNITED STATES PATENTS

| | | | |
|---|---|---|---|
| 1,199,506 | 9/1916 | Stavenhagen | 352—124 |
| 1,979,800 | 11/1934 | Howell | 352—124 X |
| 2,048,691 | 7/1936 | Ford | 352—72 |

NORTON ANSHER, Primary Examiner

MONROE H. HAYES, Assistant Examiner

U.S. Cl. X.R.

242—55.12